Aug. 21, 1934.          W. FERRIS            1,970,998
                    COIL WINDING MACHINE
                     Filed Aug. 30, 1929        3 Sheets-Sheet 2
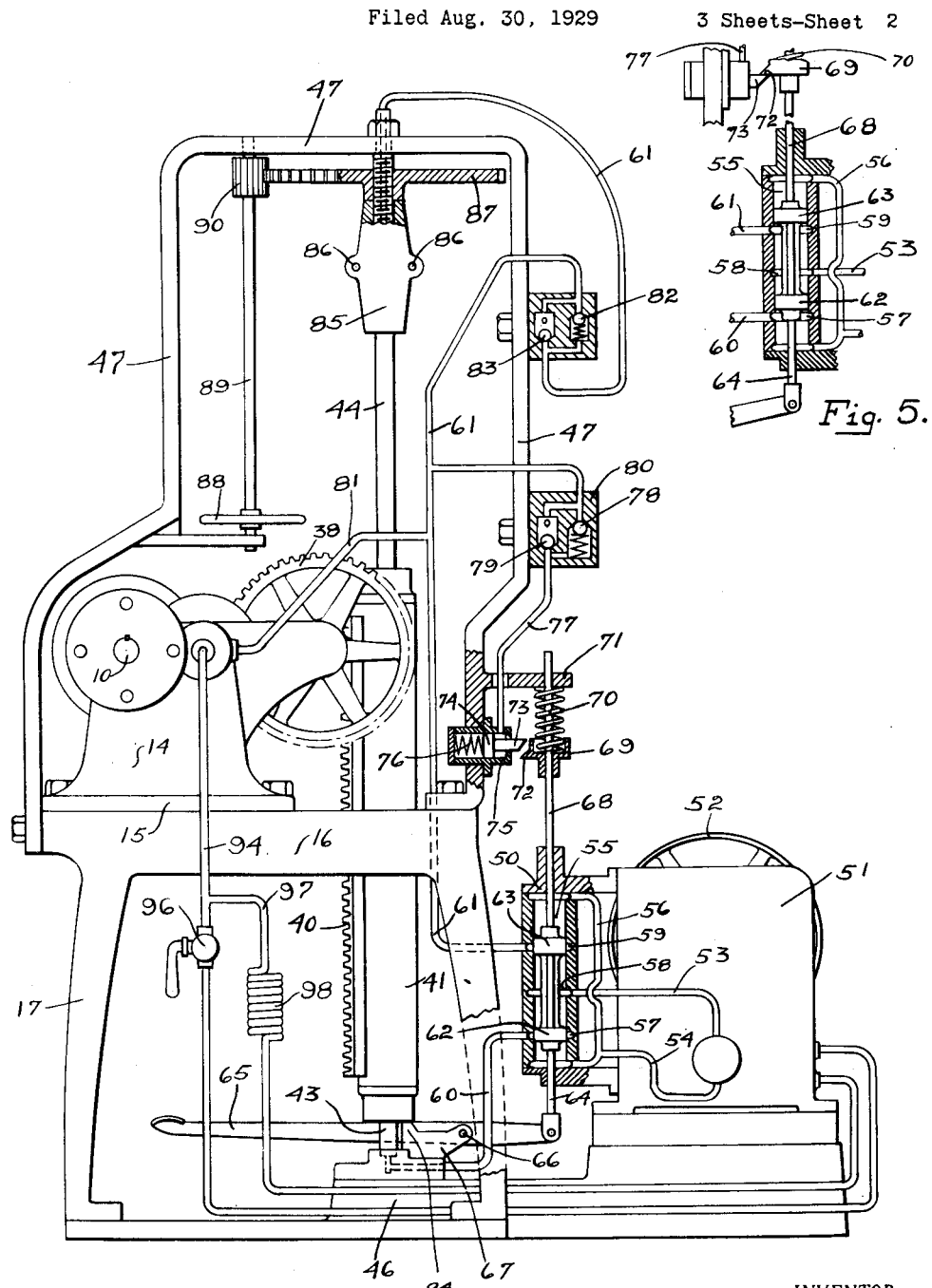
Fig. 2.                                    INVENTOR.
                                        WALTER FERRIS.
                              BY
                                        ATTORNEY.

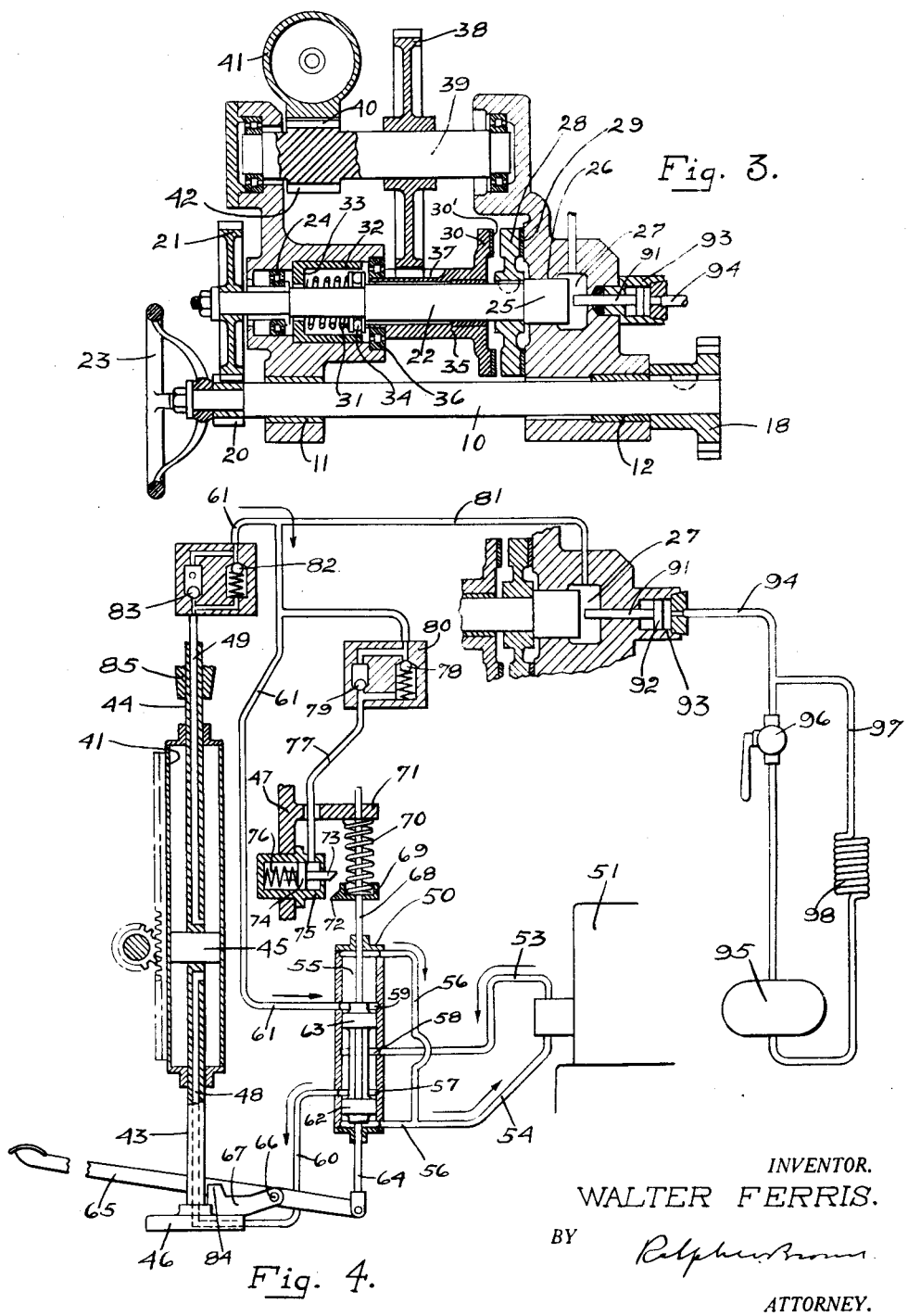

Patented Aug. 21, 1934

1,970,998

UNITED STATES PATENT OFFICE 1,970,998

COIL WINDING MACHINE

Walter Ferris, Milwaukee, Wis., assignor to The Oilgear Company, Milwaukee, Wis., a corporation of Wisconsin Application August 30, 1929, Serial No. 389,330

15 Claims. (Cl. 242—9)

This invention relates to coil winders.

Machines heretofore designed for winding magnet coils for electric motors and other electrical equipment cannot be relied upon to automatically produce in each coil the exact number of turns required. In such machines each coil is ordinarily mechanically wound until the desired number of turns have been approximated after which the winding spindle is released and manipulated by the attendant until the exact number of turns are obtained. This manipulation entails much loss of time and introduces a possibility of error due to the human equation.

One object of the present invention is the provision of a coil winding machine which will automatically and unfailingly produce the exact number of turns required.

Other more specific objects and advantages will appear from the following description of an illustrative embodiment of the present invention.

Although the invention is shown as embodied in a coil winding machine certain features thereof may be used to advantage in other types of machines involving the measuring or dividing of material into predetermined lengths.

In the drawings:—

Fig. 2 is a side elevation thereof, with parts shown in section.

Fig. 3 is a horizontal section taken substantially along the line 3—3 of Fig. 1.

Fig. 4 is a diagrammatic view illustrating the hydraulic circuit employed therein.

Fig. 5 is a sectional view of the control valve shown in Figs. 2 and 4, illustrating another characteristic position thereof.

Figure 1:
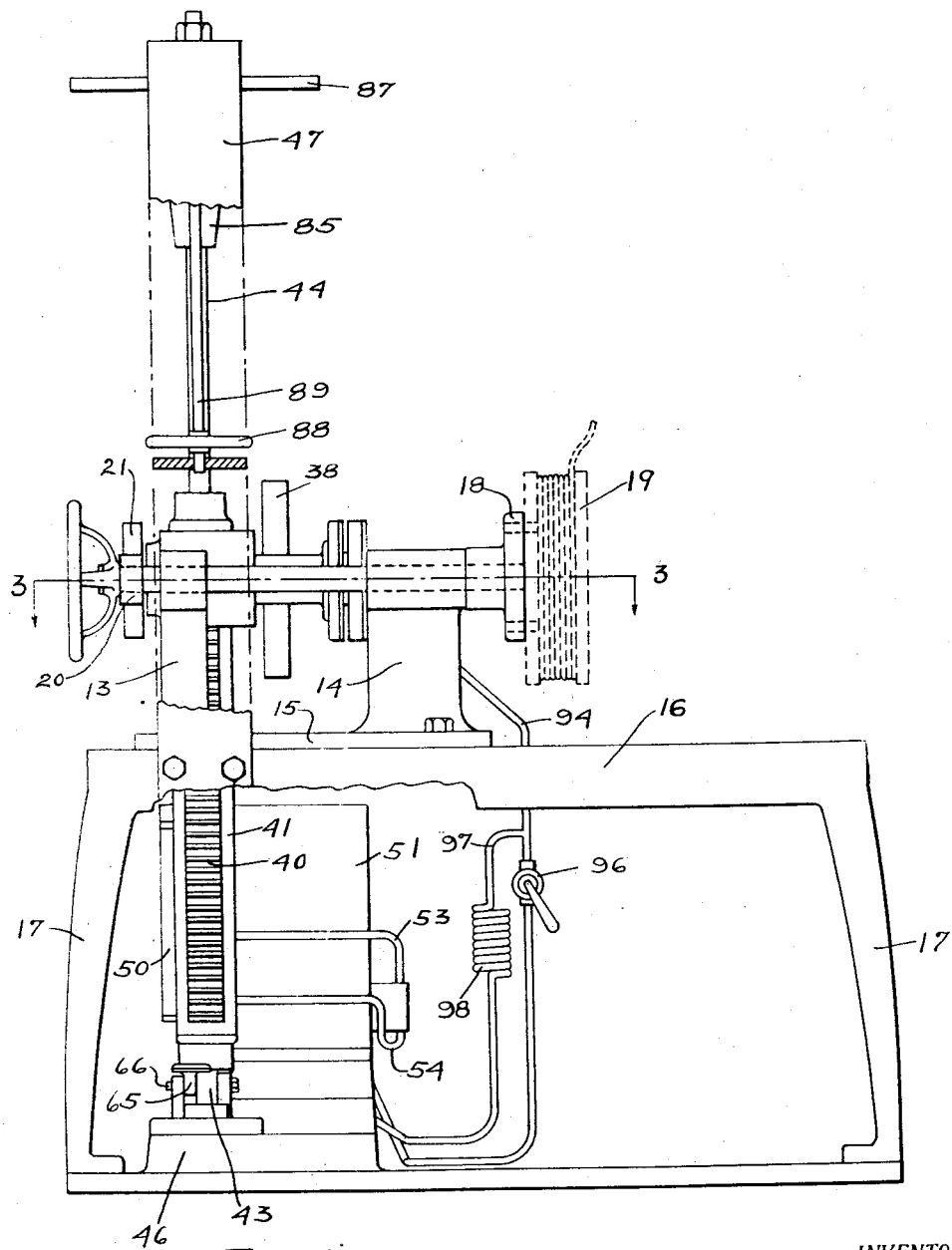
Figure 1 is a front elevation of a coil winding machine embodying the present invention.

The coil winder shown comprises a spindle 10, journaled in appropriate bearings 11 and 12, supported upon uprights 13 and 14, respectively which rise from a base plate 15. The base plate 15 is removably fixed to a bed 16 mounted upon suitable legs 17. A face plate or disk 18 fixed to one end of the spindle 10 is designed to receive the form 19 upon which the coil is wound. The spindle is normally driven by a wide faced pinion 20 fixed thereto and meshing with a gear 21 fixed to a shaft 22, although a hand wheel 23 fixed to the spindle provides for manual manipulation thereof.

The shaft 22 is journaled at one end in a floating anti-friction bearing 24 which permits limited lengthwise movement of the shaft. The other end of the shaft is formed with an enlarged cylindrical portion 25, closely fitted for rotation and lengthwise movement in a bore 26, and exposed to the contents of a chamber 27. A disk 28 fixed on the shaft 22 coacts with a fixed friction face 29 to form a brake for the shaft and with a friction face 30' on a clutch element 30 to form a releasable driving connection for the shaft. A spring 31, housed within a sleeve 32, bears against an internal flange 33 on the sleeve and against an anti-friction bearing 34 on the shaft, so as to normally urge the shaft toward the right (Fig. 3) to thereby free the disk 28 from the clutch element 30 and to hold the disk against the braking surface 29. In this position of the parts the shaft 22 and spindle 10 are of course held against rotation by the frictional contact between disk 28 and surface 29. When the shaft 22 is shifted toward the left from the position shown in Fig. 3 the disk 28 is first released from the surface 29 and ultimately engaged with the surface 30' on the clutch element 30 to thereby establish a driving connection between the element 30 and shaft. This is accomplished in this instance by supplying fluid pressure to the chamber 27 in a manner to be later described. The element 30 is carried by a quill shaft 35 rotatable upon the shaft 22 and in an anti-friction bearing 36, the quill shaft having pinion teeth 37 formed thereon and meshing with a gear 38 fixed on a drive shaft 39.

The shaft 39 is driven alternately in opposite directions by a rack 40 formed upon or fixed to the side of a cylinder 41 and meshing with a pinion 42 fixed on the shaft. The cylinder 41 is mounted for vertical travel along a pair of aligned piston rods 43 and 44. The rods 43 and 44 are connected through an intermediate stationary piston 45 within the cylinder 41, the lower rod 43 being anchored in an appropriate base casting 46 and the upper rod 44 being anchored in a top frame 47 secured to and extending above the bed 16. Longitudinal passages 48 and 49 in the rods communicate with the lower and upper ends of the cylinder, respectively, and through a control valve 50 with an appropriate fluid pressure source such as a pump 51. The pump shown is of the type described in my prior Patent No. 1,578,233. It is driven at constant speed through a pulley 52 and by appropriate adjustment may be caused to deliver liquid at any selected rate through a pipe 53. Liquid is returned to the pump through a pipe 54. The control valve 50 comprises a cylinder mounted on the pump casing and having a longitudinal bore 55 whose opposite ends are connected through a pipe 56 with the pipe 54. The bore contains three annular grooves 57, 58, and 59. Groove 57 communicates with a pipe 60 leading to the passage 48 in lower rod 43; intermediate groove 58 communicates with pipe 53; and groove 59 communicates with pipe 61 leading to the passage 49 in the upper rod 44. A plunger having two spaced heads 62 and 63 is closely fitted for lengthwise travel in the bore. When the plunger is in the intermediate or neutral position of Fig. 2 grooves 57 and 59 are closed by the heads 62 and 63 respectively; when elevated into the position of Fig. 5 groove 57 is open to the return pipe 54 through pipe 56 and groove 59 is open to the pressure pipe 53; and when depressed into the position of Fig. 4 groove 59 is open to the return pipe and groove 57 is open to the pressure pipe 53.

A stem 64 depending from the valve plunger is connected with one end of a pedal lever 65 which is rockably supported upon a pin 66 in an appropriate bracket 67. The lever 65 projects across the path of travel of the cylinder 41 so that as the cylinder approaches the lower limit of its stroke it engages and forces the lever downwardly into the intermediate position of Fig. 2 to thereby automatically return the control valve to the neutral position illustrated in that figure. A second stem 68 projecting upwardly from the valve plunger carries a stop 69 adjustably fixed thereto. A compression spring 70 interposed between the stop 69 and an appropriate bracket 71 urges the valve plunger downwardly toward the position of Fig. 4. The stop 69 is provided with a nose 72 fashioned to coact with a spring loaded detent 73 in such manner as to permit the stop to be lifted with the valve plunger into the position of Fig. 5 and to be releasably retained in this elevated position by the detent. The detent shown comprises a plunger having a piston 74 at one end thereof fitted for lengthwise movement within a cylinder 75 fixed in the frame 47. A spring 76 pressing against the rear face of the piston 74 yieldably retains the plunger in projected position where it will engage the stop 69. A pipe 77 connected with the cylinder 75 in front of the piston 74 communicates with the pipe 61 so that fluid pressure within the pipe 61 may be utilized to withdraw the detent 73 and thus release the stop 69. A spring loaded relief valve 78 of a well known type is interposed within the pipe 77 to prevent transmission of pressure to the cylinder 75 until the pressure in pipe 61 reaches a predetermined degree, and a check valve 79 connected in parallel with the valve 78 permits the escape of fluid pressure from cylinder 75 to pipe 61 upon a reduction in pressure in pipe 61. Both valves 78 and 79 are preferably combined in a single housing block 80 attached to the frame 47.

A pipe 81 connects chamber 27 with pipe 61 so that whenever pipe 61 is subjected to high pressure the shaft 22 and disk 28 are shifted to the left to thereby establish a driving connection for the shaft. In order to insure that a driving connection is thus established prior to the actuation of the driving cylinder 41 a spring loaded relief valve 82 is interposed in the pipe 61, between the pipe 81 and the passage 49 in the upper rod 44. This valve prevents the admission of liquid to the passage 49 until the pressure in pipe 61 is sufficient to open this valve, which pressure is also more than sufficient to insure shifting of the shaft 22 and closure of the clutch. A check valve 83 connected in parallel with the valve 82 permits a free escape of liquid through pipe 61 from the passage 49.

The down stroke of the cylinder 41 is accurately limited by a positive stop 84 in the form of a lug which in this instance is integral with the bracket 67. The up-stroke of the cylinder is also accurately limited by a second positive stop 85 adjustably mounted upon the rod 44. The stop 85 is in the form of a split sleeve clamped onto the rod by bolts 86 and bearing against the hub of a gear wheel 87 which is in screw threaded engagement with the rod. In order to obtain wide variations in the stroke of the cylinder 41 the stop sleeve 85 may be replaced by similar stop sleeves of various lengths, but by rotation of the gear wheel 87 to effect adjustment of the selected sleeve upon the rod a micrometer adjustment of the stroke of the cylinder may be obtained. The gear wheel 87 is manually operated by a hand wheel 88 through a vertical shaft 89 and wide faced pinion 90.

A complete operation of the machine will now be given. The pump is operated continuously but, with the control valve 50 in the intermediate position of Fig. 2, both pipes 60 and 61 are blocked by the heads 62 and 63 and the cylinder 41 is at rest. Before starting the cylinder 41 rests against the lower stop 84 and against the lever 65 so as to retain the lever and valve in neutral position against the pressure of the spring 70. To start the machine the attendant depresses the lever 65 so as to elevate the valve plunger into the position of Fig. 5, in which position it is releasably retained by the engagement of detent 73 beneath the stop 69. When the valve plunger assumes this position liquid is forced from the pump through pipes 53, 61, and 81 into the chamber 27 to thereby shift the shaft 22 and disk 28 toward the left to effect a driving connection between the clutch element 30 and shaft. The liquid in pipe 61 then finds its way through the relief valve 82 and through passage 49 into the upper end of the cylinder 41 and drives the cylinder upwardly. During its upward travel the cylinder drives the shaft 39 through the rack 40 and pinion 42, this motion being transmitted to the spindle 10 through the gear 38, pinion 37, clutch element 30 and disk 28, gear 21 and pinion 20. The spindle 10 and winding form thus continue to rotate until the cylinder 41 stalls against the upper positive stop 85. When this occurs the pressure in pipe 61 immediately rises to a point where the relief valve 78 opens and admits fluid pressure through pipe 77 to the cylinder 75 to thereby retract the detent 73 and permit the plunger of valve 50 to assume the lower position of Fig. 4 in which position pipe 61 is connected to the return side of the pump through pipes 56 and 54, so that the pressure in pipe 61 is destroyed, and pipe 60 is connected to the pressure pipe 53, so that the cylinder 41 then begins a down stroke. Simultaneously with the drop in pressure in pipe 61, the pressure in chamber 27 is of course destroyed permitting the shaft 22 to reassume the position of Fig. 3 with the disk 28 disengaged from clutch element 30 and in frictional contact with the braking surface 29, so that the shaft 22 and spindle 10 remain at rest during the down stroke of the cylinder 41. Furthermore the pressure in cylinder 75 is destroyed by the drop in pressure in the pipe 61, so that the detent 73 is again projected by the spring 76 into the path of travel of the nose 72 of collar 69.

It will be noted that when the plunger of valve 50 assumes the lower position of Fig. 4 the pedal lever 65 is elevated. As the cylinder 41 approaches the end of its down stroke it engages the lever 65 and depresses it into the intermediate position of Fig. 2, thereby shifting the plunger of valve 50 into the intermediate position of that figure so as to block both pipes 60 and 61 and bring the cylinder 41 to rest. The cylinder 41 always comes to rest against the lower stop 84 so as to insure starting from a definite point upon each upward or driving stroke.

From the foregoing it will be noted that the clutch, including the elements 28 and 30, is always closed automatically prior to the beginning of the upward driving stroke of the cylinder 41, so that a positive driving connection is maintained between the spindle 10 and cylinder throughout the driving stroke, and the number of revolutions made by the spindle thus corresponds exactly to the extent of travel of the cylinder. Since the extent of travel of the cylinder is accurately determined by the positive stops 84 and 85 the spindle 10 and form 19 may be relied upon to make a definite number of turns during each operation of the machine. Any desired number of turns may be obtained by the selection of a stop 85 of appropriate length and by proper adjustment of that stop through the gear 87, pinion 90 and hand wheel 88.

It will of course be understood that the wire to be wound is attached to the form 19 in any customary or approved manner prior to each winding operation and that, after the desired number of turns have been applied by a single upstroke of the cylinder 41, the wire is severed adjacent the coil and the remaining end properly tied by the attendant. This cutting and tying may be performed during the downward or return stroke of the cylinder.

In the machine shown provision is made for freeing the spindle 10 so as to permit manipulation thereof through the hand wheel 23. For this purpose a plunger 91 is provided which is arranged to thrust the shaft 22 toward the left a slight distance sufficient to cause the disk 28 to assume an intermediate position free from both faces 29 and 30'. Plunger 91 is actuated by a piston 92 attached thereto and fitted within a cylinder 93. Fluid pressure may be supplied to the cylinder 93 through a pipe 94 from an appropriate pressure source, such as a gear pump 95 of a well known type. A cut-off valve 96 controls communication between the pump and cylinder. A pipe 97 connected with the pipe 94, between the valve 96 and cylinder 93, leads back to the return side of the pump 95, and contains a choke coil 98 which restricts the flow of liquid therethrough. The arrangement is such that when the valve 96 is opened the piston 92 is actuated to thrust the plunger 91 against the end of shaft 22 and thereby force the shaft toward the left to free the disk 28 from the surface 29. The spindle 10 is then free for rotation by manipulation of the hand wheel 23. Then when the valve 96 is closed the pressure in the cylinder 93 is dissipated through the pipe 97 and choke coil 98 permitting the shaft 22 and disk 28 to return to the position of Fig. 3, under the action of the spring 31.

Various changes may be made in the embodiment of the invention hereinabove specifically described without departing from or sacrificing the advantages of the invention as defined in the appended claims.

I claim:

1. In a coil winding machine the combination of a winding spindle, a reciprocable member, a speed-up gear train driven by said member for rotating said spindle, and positive stops for limiting the movement of said member to thereby predetermine the number of turns wound by said spindle for each reciprocation of said member.

2. In a coil winding machine the combination of a winding spindle, fluid actuated reciprocable motor, a speed-up gear train actuated by said motor for rotating said spindle, positive stops for limiting the action of said fluid actuated means to thereby predetermine the number of turns wound by said spindle.

3. In a coil winding machine the combination of a winding spindle, a piston and cylinder assembly, a speed-up gear train actuated by said piston and cylinder assembly for rotating said spindle, and positive stops for limiting the stroke of said piston and cylinder assembly to thereby predetermine the number of turns wound by said spindle.

4. In a coil winding machine the combination of a winding spindle, a piston and cylinder assembly, driving connections actuated by said piston and cylinder assembly for rotating said spindle, said connections including a clutch, positive stops for limiting the stroke of said piston and cylinder assembly to thereby predetermine the number of turns wound by said spindle, and automatic means for closing and opening said clutch.

5. In a coil winding machine the combination of a winding spindle, a piston and cylinder assembly, driving connections actuated by said piston and cylinder assembly for rotating said spindle, said connections including a normally open clutch, means for energizing said piston and cylinder assembly, means automatically operable to close said clutch prior to the actuation of said piston and cylinder assembly, and means for limiting the stroke of said piston and cylinder assembly to thereby predetermine the number of turns wound by said spindle.

6. In a coil winding machine the combination of a rotary spindle, a hydraulic motor, driving connections including a clutch between said motor and spindle, means for delivering liquid to said motor to operate the same, hydraulic means connected to said last named means and responsive to said delivery of liquid for automatically closing said clutch before said motor starts, means for stopping said motor, means responsive to the stopping of said motor for opening said clutch.

7. The combination of a driven member, a hydraulic motor, driving connections including a clutch between said motor and member, means for rendering said motor active and inactive, fluid means responsive to said last named means for automatically closing said clutch before said motor becomes active, and means for opening said clutch in response to said motor becoming inactive.

8. The combination of a driven member, a brake therefor, a hydraulic motor, driving connections including a clutch between said motor and member, means for rendering said motor active and inactive, and means responsive to said last named means for automatically closing and opening said clutch and for automatically releasing and applying said brake.

9. The combination of a driven member, a reciprocable hydraulic motor, driving connections including a clutch between said motor and member, means for energizing said motor, positive stops for limiting the extent of reciprocation of said motor, means automatically operable to maintain said clutch closed throughout the operation of said motor in one direction and to maintain said clutch open throughout the operation of said motor in the opposite direction, and a brake automatically operable to prevent movement of said member during operation of said motor in said opposite direction.

10. The combination of a driven member, a reciprocable hydraulic motor, means for energizing said motor, stops for limiting the extent of reciprocation of said motor, driving connections between said motor and member automatically operable to drive said member throughout the operation of said motor in one direction only, and a brake automatically operable to prevent operation of said member during operation of said motor in the opposite direction.

11. The combination of a rotary member, hydraulically actuated means including a reciprocating member for driving said rotary member, means under the control of the operator for energizing said hydraulically actuated means, a positive stop for limiting the movement of said reciprocating member in one direction, means automatically operable to reverse said hydraulically actuated means upon impingement of said reciprocating member against said stop, a second positive stop for limiting the movement of said reciprocating member in the opposite direction, and means automatically operable to deenergize said hydraulically actuated means upon impingement of said reciprocating member against said second stop.

12. The combination of a rotary member, a fluid motor for driving said member, a clutch between said motor and member, a second fluid motor for controlling said clutch, and means for effecting operation of said motors in predetermined sequence.

13. The combination of a rotary member, a reciprocable fluid motor for driving said member, a clutch between said motor and member, fluid means for automatically closing said clutch prior to each movement of said motor in one direction, and means for holding said member against actuation during each movement of said motor in a reverse direction.

14. The combination of a rotary member, a reciprocable fluid motor for driving said member, positive driving connections including a clutch between said motor and member, means for positively limiting the extent of reciprocation of said motor to thereby limit the extent of rotation of said member, a second fluid motor for controlling said clutch, and means for effecting operation of said motors in predetermined sequence.

15. The combination of a rotary member, a reciprocable fluid motor for driving said member, means for positively limiting the extent of operation of said motor to thereby limit the extent of rotation of said member, and means under the control of said operator for rotating said member independently of said motor.

WALTER FERRIS.